United States Patent [19]

Packer

[11] 4,295,800
[45] Oct. 20, 1981

[54] ENERGY CONVERTOR

[76] Inventor: Bernard A. Packer, 328 Duthie Ave., Rockhampton North, Queensland, 4701, Australia

[21] Appl. No.: 72,162

[22] Filed: Sep. 4, 1979

[30] Foreign Application Priority Data

| Sep. 7, 1978 | [AU] Australia | PD5859 |
| Nov. 10, 1978 | [AU] Australia | PD6730 |
| Mar. 9, 1979 | [AU] Australia | PD7983 |

[51] Int. Cl.³ .............................................. F04B 17/00
[52] U.S. Cl. ..................................... 417/333; 60/499; 60/506
[58] Field of Search ................. 60/398, 497, 499, 506; 417/332, 333, 330, 331; 290/42, 53

[56] References Cited

U.S. PATENT DOCUMENTS

| 986,740 | 3/1911 | Mobius | 60/499 |
| 1,055,378 | 3/1913 | Willy | 417/330 X |
| 1,887,316 | 11/1932 | Locktaw | 417/330 |

FOREIGN PATENT DOCUMENTS 274386 5/1930 Italy ..................................... 60/497

Primary Examiner—Allen M. Ostrager
Assistant Examiner—Stephen F. Husar
Attorney, Agent, or Firm—Haseltine and Lake

[57] ABSTRACT

The invention relates to a device for converting energy generated by ocean swells or waves so as to drive hydraulic pumps, generators and the like which comprises a support frame and a carriage which is movable in said support frame in an upward or downward direction. The carriage has a float member mounted on tracks on the carriage which is subject to impact from the waves from a downward location to upward location and vice versa. Suitably the tracks are curved so that the radius of curvature decreases from the downward location to the upward location. The float member may have linkage means attached to the pump or generator.

4 Claims, 2 Drawing Figures

ENERGY CONVERTOR

BACKGROUND OF THE INVENTION

THIS INVENTION relates to a device for converting energy wherein the device may be actuated by ocean waves or swells and wherein the energy generated by the ocean waves is converted into mechanical energy or other forms of energy.

Hitherto attempts to drive electrical generators, pumps such as piston pumps and alternators by energy conversion devices actuated by sea power have not proved particularly successful for various reasons. One reason in particular was that most of the energy was dissipated during operation of the device and hence there was insufficient energy generated for the required purpose.

SUMMARY OF THE INVENTION

It is an object of the invention to provide a device for converting energy actuated by ocean waves which is simple in construction and effective in operation.

The energy conversion device of the invention includes:
 a support frame;
 a carriage member which is desirably movable in an upward or downward direction relative to the support frame;
 track means associated with said carriage member whereby the track means is orientated at an angle relative to the horizontal so as to define a downward location and an upward location; and
 a float member movable on said track means from said downward location to said upward location due to pressure from ocean waves or swells whereby energy generated by movement of said float member may be converted to mechanical or other forms of energy.

The support frame may be of any suitable type and in one form may include a plurality of spaced uprights or piles which may be interconnected by cross members so as to provide rigidity and strength to the resulting structure. In a preferred form the frame includes four spaced uprights defining a rectangle in plan view.

Each of the uprights referred to above suitably has a track attached thereto or guide member so as to guide movement of the carriage member in its upward or downward movement.

The carriage member may be provided with guide rollers or wheels which are each engaged in a corresponding track or guide associated with a respective upright. The carriage member is suitably rectangular in plan view.

The carriage member has track means associated therewith and suitably the track means slopes relative to the horizontal so as to have an upward and downward location. One track may be utilized for supporting a float member and ideally this is located in the central region of the carriage member.

More preferably however there are employed two opposing tracks on opposite sides of the carriage member and these may be of any appropriate configuration such as channel rails or angle rails adapted to support guide rollers or wheels attached to the base of the float member.

The track means may be oriented at the same constant angle throughout its length relative to the horizontal but more preferably it is initially formed at its downward location with a slight upward taper or curve which becomes steeper throughout its length until at its upright location the track means may substantially be parallel to an upright of the support frame. Also it is much preferred for the track means to be arcuate during its upper end portion when compared to the lower end and intermediate portions wherein it is preferably oriented at a constant angle relative to the horizontal. In fact most preferably the track means has a parabolic configuration.

The float member may be of any appropriate configuration but is suitably in the form of an elongate trough or boat having one side which faces the ocean waves scalloped or scoop shaped so as to provide greater area for water impact. In fact one long side of the trough may have attached thereto a blade member which has an arcuate transverse cross section whereby the arc curves inwardly from the two opposing edges of the blade member.

The float member may have attached thereto translating means wherein the energy generated by the impact of the waves on the float member and forcing the float member to move from the downward location to the upward location may be translated or converted into mechanical or other energy. In one form this may include attachment means to a hydraulic ram assembly and thus there may be provided one or more connection arms to the piston rod of a hydraulic ram.

There also may be provided lifting means for the carriage member if desired and in one form this may include a hydraulic ram which is attached to the carriage and which facilitates an upward or downward movement of the carriage.

BRIEF DESCRIPTION OF THE DRAWINGS

Reference is made to a preferred embodiment of the invention as shown in the attached drawings wherein.

DESCRIPTION OF THE PREFERRED EMBODIMENTS

Figure 1:
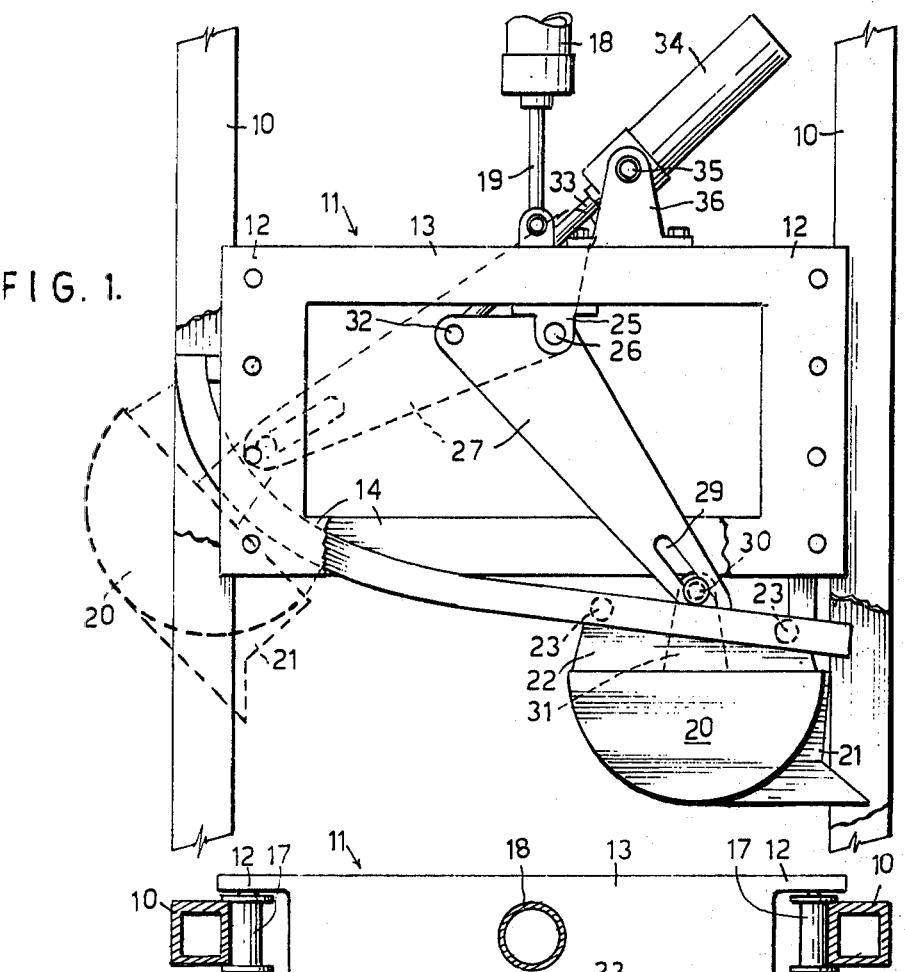
FIG. 1 is a side view of a device constructed in accordance with the invention.
Figure 2:
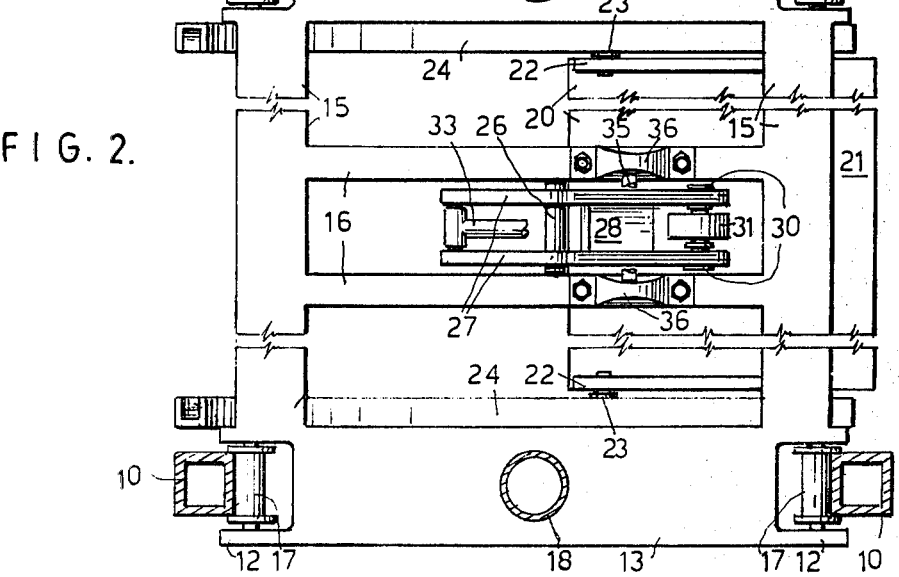
FIG. 2 is a plan view of the device shown in FIG. 1.

As shown in the drawings, the device includes a support frame which has four fixed box-section posts 10, and a carriage 11 is mounted for vertically adjustable movement on these posts. The carriage includes two similar side frames, each of upright front and back channels 12 rigidly interconnected by horizontal top and bottom members 13 and 14. The two side frames of the carriage are interconnected rigidly by front and back cross-members 15, and these are interconnected, at the top of the carriage, by a pair of longitudinal members 16.

Rotatably mounted in each of the four channels 12 is a series of equally spaced rollers 17 engaging a support frame post 10. The carriage 11 may be adjustably raised and lowered by a pair of hydraulic cylinders 18 depending from the top (not shown) of the support frame, their pistons 19 being secured to the two top members 13.

A float 20 of semi-cylindrical shape and with a front impact plate 21, has two side brackets 22, each carrying front and back rollers 23 travelling in a channelled track 24. The two tracks are secured to the inside faces of the two side frames of the carriage 11, both using curved correspondingly upward towards the rear, the radius of curvature decreasing from front to back.

Mounted below the carriage longitudinal members 16 are bearings 25 for the fulcrum 26 of a pair of similar parallel bell-cranks 27 rigidly interconnected by a crosspiece 28. Corresponding downwardly extending arms of the two bell-cranks 27 are similarly slotted at 29 for engagement by rollers 30 carried by a common shaft on opposite sides of a bracket 31 mounted centrally on the top of the float 20. The other corresponding arms of the two bell-cranks 27 carry a pivot 32 for the piston 33 of a hydraulic pump 34, the cylinder of which has trunnions 35 carried by a pair of bearing brackets 36 on the longitudinal members 16 of the carriage 11.

This energy generated by the waves is translated to energy for driving the ram by virtue of movement of float 20 and associated bell cranks 27 driving the piston 33 of the hydraulic pump 34.

Instead of the pair of bell cranks illustrated, it will be appreciated that any other appropriate linkage means may be utilized between the float 20 and the piston 33 of pump 34. Thus a single linkage could be utilized such as a connection rod having a single bell crank or slot which is engageable by a roller in a similar manner as illustrated above, could be attached to the piston. Alternatively a plurality of interconnected linkages could be utilized between the float 20 and the piston 33.

It is believed that the energy convertor of the invention will be useful in driving electrical generators, pumps and the like and provides considerable advantages over prior art energy conversion devices.

Thus the device of the invention can be utilized close to shore or on a submersible platform, the carriage is adjustable for varying heights of waves, and the support frame provides only minimal resistance to the motion of the waves. There is also the advantage of ease of maintenance for the device can be lifted from the water at any appropriate time.

I claim:

1. In an energy conversion device of the type including:
   a support frame;
   a carriage member which is movable in an upward or downward direction relative to the support frame;
   track means associated with said carriage member whereby the track means is orientated at an angle relative to the horizontal so as to define a downward location and an upward location, said track means being curved towards the upward location from the downward location, the radius of curvature decreasing from the downward location to the upward location; and
   a float member movable on said track means from said downward location to said upward location due to pressure from ocean waves or swells whereby energy generated by movement of said float member may be converted to mechanical or other forms of energy; the improvement comprising: a pump means pivotally mounted on said carriage member, and linkage means pivotally attached to said pump means and to said float member.

2. A device as claimed in claim 1 wherein the linkage means includes a bell crank or lever having an elongate slot in a lower portion thereof which is engaged by a roller attached to the float.

3. A device as claimed in claim 1 wherein the linkage means includes a pair of bell cranks rigidly interconnected with each other, said pair of bell cranks in their respective lower portions thereof having a pair of opposed slots for engagement by a pair of rollers which are attached by a common shaft which is attached to a bracket mounted on the float member.

4. A device as claimed in claim 1 wherein the carriage member includes guide rollers which engage in tracks in the support frame.

* * * * *